(12) United States Patent
Huth et al.

(10) Patent No.: US 9,876,218 B2
(45) Date of Patent: Jan. 23, 2018

(54) INTERMITTENT COATING OF MOVING SURFACES

(71) Applicant: VW-VM Forschungsgesellschaft mbH & Co. KG, Ellwangen Jagst (DE)

(72) Inventors: Andreas Huth, Ellwangen (DE); Robert Sekler, Ellwangen-Rattstadt (DE)

(73) Assignee: VW-VM Forschungsgesellschaft mbH & Co. KG (DE)

( * ) Notice: Subject to any disclaimer, the term of this patent is extended or adjusted under 35 U.S.C. 154(b) by 0 days.

(21) Appl. No.: 15/181,789

(22) Filed: Jun. 14, 2016

(65) Prior Publication Data

US 2016/0293933 A1    Oct. 6, 2016

Related U.S. Application Data

(62) Division of application No. 14/342,471, filed as application No. PCT/EP2012/068006 on Sep. 13, 2012, now Pat. No. 9,391,312.

(30) Foreign Application Priority Data

Sep. 13, 2011    (DE) .................. 10 2011 082 631

(51) Int. Cl.
*H01M 4/04*    (2006.01)
*B05B 11/00*    (2006.01)
(Continued)

(52) U.S. Cl.
CPC ....... *H01M 4/0416* (2013.01); *B05B 11/3097* (2013.01); *B05C 5/025* (2013.01);
(Continued)

(58) Field of Classification Search
CPC .. H01M 4/0416; H01M 4/0404; H01M 4/139; B05C 5/025; B05C 5/0258;
(Continued)

(56) References Cited

U.S. PATENT DOCUMENTS 3,052,565 A    9/1962   Chinn et al.
3,547,052 A    12/1970  Artiaga et al.
(Continued)

FOREIGN PATENT DOCUMENTS

EP    1 604 600 A2    12/2005
JP    8-229481 A       9/1996
(Continued)

*Primary Examiner* — Laura Edwards
(74) *Attorney, Agent, or Firm* — DLA Piper LLP (US)

(57) ABSTRACT

A device that intermittently coats a moving surface with a paste containing electrochemically active particles including a nozzle having a slot-shaped delivery opening, a paste reservoir from which paste being supplied to the delivery opening via a transport channel, a rotary valve having a rotatably mounted control axle that enables the paste supply to the delivery opening in a first switching position and, in a second switching position, blocks the transport channel and disconnects a section of the transport channel extending as far as the delivery opening from the paste supply, and a reduced pressure source in communicating connection with the rotatably mounted control axle via a reduced pressure channel, wherein the rotatably mounted control axle comprises a passage via which the paste reservoir is in communicating connection with the delivery opening in the first switching position and via which the delivery opening is in communicating connection with the reduced pressure source in the second switching position.

4 Claims, 2 Drawing Sheets

(51) Int. Cl.
*H01M 4/139* (2010.01)
*B05C 5/02* (2006.01)
*B05D 1/26* (2006.01)
*F16K 11/074* (2006.01)
*F16K 11/083* (2006.01)
*B05B 1/16* (2006.01)

(52) U.S. Cl.
CPC ......... *B05C 5/0258* (2013.01); *H01M 4/0404* (2013.01); *H01M 4/139* (2013.01); *B05B 1/1636* (2013.01); *B05B 1/1645* (2013.01); *B05B 1/1672* (2013.01); *B05B 1/1681* (2013.01); *B05C 5/0254* (2013.01); *B05D 1/26* (2013.01); *B05D 1/265* (2013.01); *F16K 11/074* (2013.01); *F16K 11/083* (2013.01)

(58) Field of Classification Search
CPC ... B05C 5/0254; B05B 1/1636; B05B 1/1672; B05B 11/3097; B05B 1/1681; B05B 1/1645; F16K 11/074; F16K 11/083; Y02E 60/12; Y02E 60/122; B05D 1/26; B05D 1/265
USPC ............ 118/400, 407, 410, 429; 137/625.11, 137/625.16, 625.47, 876; 239/436, 581.1; 401/281; 29/2; 141/1.1, 32, 33
See application file for complete search history.

(56) References Cited

U.S. PATENT DOCUMENTS

| | | | |
|---|---|---|---|
| 4,218,013 A | * | 8/1980 | Davison .................. B05B 7/12 137/889 |
| 5,360,629 A | | 11/1994 | Milbourn et al. |
| 5,536,313 A | | 7/1996 | Watanabe et al. |
| 5,771,928 A | * | 6/1998 | Zepic .................. F16K 11/0853 137/625.22 |
| 5,824,156 A | | 10/1998 | Watanabe et al. |
| 5,989,622 A | | 11/1999 | Iwashita et al. |
| 6,284,405 B2 | | 9/2001 | Kaido et al. |
| 7,604,842 B2 | | 10/2009 | Shida et al. |
| 9,061,314 B2 | | 6/2015 | Kim |
| 2002/0053406 A1 | * | 5/2002 | Baltensperger ....... B42C 9/0006 156/410 |
| 2003/0230647 A1 | | 12/2003 | Puffe |
| 2004/0062866 A1 | | 4/2004 | Masuda et al. |
| 2006/0126263 A1 | | 6/2006 | Tsunekawa et al. |
| 2007/0026312 A1 | | 2/2007 | Imachi et al. |
| 2009/0001099 A1 | | 1/2009 | Kennedy et al. |
| 2011/0171377 A1 | | 7/2011 | Mues et al. |

FOREIGN PATENT DOCUMENTS

| | | | |
|---|---|---|---|
| JP | 11-221512 A | | 8/1999 |
| JP | 11-333359 A | | 12/1999 |
| JP | 2007253013 | * | 10/2007 |
| JP | 2009-39617 A | | 2/2009 |

* cited by examiner

INTERMITTENT COATING OF MOVING SURFACES

TECHNICAL FIELD

This disclosure relates to a method and a device for the intermittent coating of moving surfaces with a paste which contains electrochemically active particles, a nozzle having a slot-shaped delivery opening being employed.

BACKGROUND

The term "battery" originally meant a plurality of galvanic cells connected in series. Nowadays, however, individual galvanic cells are often also referred to as a battery. When a galvanic cell is being discharged, a chemical reaction delivering energy takes place, which consists of two subreactions electrically coupled to one another, but spatially separated from one another. At the negative electrode, electrons are released in an oxidation process, resulting in a flow of electrons via an external load to the positive electrode, by which a corresponding quantity of electrons is received. At the positive electrode, a reduction process thus takes place. Simultaneously, a flow of ions corresponding to the electrode reaction takes place inside the cell. This flow of ions is ensured by an ion-conducting electrolyte. In secondary cells and batteries, this discharge reaction is reversible, that to say the conversion of chemical energy taking place during the discharge can be reversed into electrical energy.

Among known secondary cells and batteries, relatively high energy densities are achieved in particular by lithium ion batteries. In many cases, lithium ion batteries contain a cell stack consisting of a plurality of individual cells. Wound cells (coils) are also frequently used. The cells in a lithium ion battery are usually a composite of electrode foils and separator sheets with the sequence positive electrode/separator/negative electrode. Often, such individual cells are produced as so-called "dual" cells with the possible sequences negative electrode/separator/positive electrode/separator/negative electrode or positive electrode/separator/negative electrode/separator/positive electrode. The electrodes in that case conventionally comprise metal current collectors, which are usually in the form of flat structures. The case of positive electrode usually involves meshes or sheets of aluminum, for example, made of expanded aluminum metal or a perforated aluminum foil. On the side of the negative electrode, meshes or foils of copper are usually employed.

In general, the described cells for lithium ion batteries are produced in a multistage method. It is conventional for the aforementioned electrode foils to be produced in a first step, and for these then to be combined with one or more separator sheets to form the aforementioned electrode/separator composites. The electrodes and separators are usually bonded to one another in a lamination step.

To produce the electrodes, a flat layer of a paste-like material ("paste" for short), which contains electrochemically active particles, is usually applied onto a suitable collector and subsequently dried. The paste is preferably applied onto both sides of the collector. In terms of production technology, this is usually carried out by providing the collectors as quasi-endless strips, which subsequently pass through a coating unit in which a deposited coating of the collector, interrupted at defined distances in the direction of passage, is applied by intermittent coating. The collector strip emerging from the coating unit correspondingly has coated and uncoated regions alternating in the direction of passage. The collector strip may subsequently be divided up by cutting the strip in the uncoated regions.

The pastes are, for example, applied onto the collectors with a doctor blade, although wide-slot nozzles (slot-die nozzles), which are outstandingly suitable for high-throughput applications, may also be used. They have a slot-shaped delivery opening for the paste, which is supplied to them from a paste reservoir via a transport channel. For the intermittent coating, the paste flow in the direction of the delivery opening is regulated by a control means which blocks it at regular time intervals. In particular, in the case of pastes having high proportions of elastic, however, this procedure entails disadvantages. Such pastes relax, by viscous flow processes, after interruption of the paste supply in the direction of the slot-shaped delivery opening, where a drop can form, the effect of which is that an edge with an undesired thickness is formed in the next coating interval. The drop may possibly also touch the collector strip passing through and contaminate uncoated regions of the strip.

US 2004/0062866 A1 discloses a coating apparatus by which paint is applied discontinuously onto a flat base material. The paint is pumped from a reservoir into a nozzle head in which there is a collection container to which a reduced pressure can be applied by a plunger system. When the coating is interrupted, a reduced pressure can be applied to the collection container, specifically by the aforementioned plunger system. Inadvertent paint delivery can thereby be counteracted. However, there is no mention of the processing of pastes for electrodes in US 2004/0062866 A1.

It could therefore be helpful to provide a device and a method for intermittent coating of a moving surface with a paste which contains electrochemically active particles, with which the described problems relating to the formation of drops during the coating process can be avoided.

SUMMARY

We provide a method of intermittently coating a moving surface with paste containing electrochemically active particles by a nozzle having a slot-shaped delivery opening including supplying paste to the delivery opening from a paste reservoir via a transport channel; and regulating paste supply to the delivery opening with a rotatably mounted control axle which enables the paste supply to the delivery opening in a first switching position and, in a second switching position, blocks the transport channel and disconnects a section of the transport channel extending as far as the delivery opening from the paste supply, wherein the rotatably mounted control axle comprises a passage via which the paste reservoir is in communicating connection with the delivery opening in the first switching position and the disconnected section of the transport channel is in communicating connection with the reduced pressure source in the second switching position.

We also provide a method of intermittently coating a moving surface with paste containing electrochemically active particles by a nozzle having a slot-shaped delivery opening including supplying the paste to the delivery opening from a paste reservoir via a transport channel, regulating, regulating the paste supply to the delivery opening with a controller which enables the paste supply to the delivery opening in a first switching position and, in a second switching position, blocks the transport channel and disconnects a section of the transport channel extending as far as the delivery opening from the paste supply, and applying a reduced pressure to the section of the transport channel disconnected from the paste supply when the controller is in the second switching position, the controller being formed such that it connects the disconnected part of the transport channel to a reduced pressure source in the second switching position.

We further provide a device that intermittently coats a moving surface with a paste containing electrochemically active particles including a nozzle having a slot-shaped delivery opening, a paste reservoir from which the paste being supplied to the delivery opening via a transport channel, and a rotary valve having a rotatably mounted control axle which enables the paste supply to the delivery opening in a first switching position and, in a second switching position, blocks the transport channel and disconnects a section of the transport channel extending as far as the delivery opening from the paste supply, wherein the rotatably mounted control axle comprises a passage via which the paste reservoir is in communicating connection with the delivery opening in the first switching position and the disconnected section of the transport channel is in communicating connection with the reduced pressure source in the second switching position.

We still further provide a device that intermittently coats a moving surface with a paste containing electrochemically active particles including a nozzle having a slot-shaped delivery opening, a transport channel, via which the paste is supplied to the delivery opening from a paste reservoir, a controller that regulates paste supply to the delivery opening, enables the paste supply to the delivery opening in a first switching position and, in a second switching position, blocks the transport channel and disconnects a section of the transport channel extending as far as the delivery opening from the paste supply, and a reduced pressure channel via which a section of the transport channel disconnected from the paste supply can be connected to a reduced pressure source, the controller formed such that it connects the disconnected part of the transport channel to the reduced pressure source in the second switching position.

DETAILED DESCRIPTION

Figure 1A:
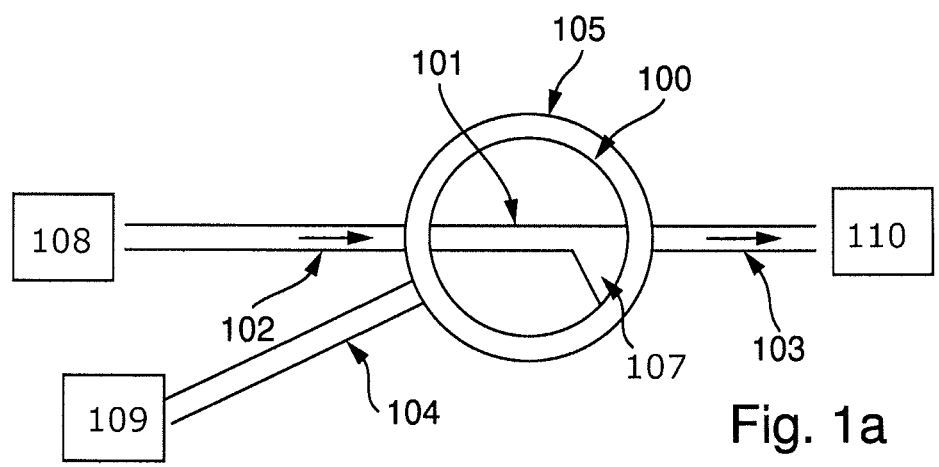
FIGS. 1a and 1b schematically illustrate the first and second switching positions of the controller of an example of our device.

Our method is used for the intermittent coating of moving objects with a paste which contains electrochemically active particles (also referred to below as "electrochemical active material"). In particular, the paste is a paste to produce battery electrodes, and the electrochemically active particles are correspondingly particles which, in the charging and/or discharging processes as described in the introduction in a battery, are chemically modified by receiving and/or releasing electrons and/or ions. In other words, our method is also a method for producing battery electrodes.

However, the method may, for example, also be used to produce the electrocatalytic layer of a fuel cell. In this case, pastes are processed which contain catalyst particles (noble metals, Raney nickel, tungsten carbide, molybdenum sulfides, tungsten sulfides or similar suitable materials) as electrochemically active particles, which can catalyze cold combustion of fuels such as hydrogen or methanol.

In producing battery electrodes, the moving surface is in particular preferably the upper and/or lower side of the collector strips mentioned in the introduction, or carrier substrates such as rolls or other flat substrates, from which electrodes formed from the paste can be transferred onto such collector strips.

It is possible to produce both positive and negative electrodes for batteries. Preferably, the moving surface is one side of a current collector made of aluminum and the paste is an electrode paste comprising a material for the positive electrode of batteries, in particular lithium ion batteries. Also preferably, the moving surface is the surface of a current collector made of copper and the paste is an electrode paste comprising a material for the negative electrode of a battery, in particular a lithium ion battery.

As an example of an electrode paste for the negative electrode of a lithium ion battery, a paste comprising a suitable solvent and/or dispersant, graphite particles as electrochemical active material, an electrode binder such as sodium carboxymethyl cellulose and, optionally, a conductivity additive, may be mentioned. Besides a suitable solvent and/or dispersant, a paste for the positive electrode can, for example, comprise lithium cobalt oxide as electrochemical active material and likewise an electrode binder and a conductivity additive. Depending on the selected active materials and binders, the pastes may have an aqueous and/or nonaqueous solvent and/or dispersant.

The pastes are applied by using a nozzle having a slot-shaped delivery opening to which the paste is supplied from a paste reservoir via a transport channel. The paste reservoir may be under pressure to deliver the paste. Alternatively, for example, a pump may also be connected downstream of the paste reservoir. The paste supply to the delivery opening is regulated by a controller that enables the paste supply to the delivery opening in a first switching position and, in a second switching position, blocks the transport channel while disconnecting a section of the transport channel extending as far as the delivery opening from the paste supply.

The method is distinguished, in particular, in that a reduced pressure is applied to the section of the transport channel disconnected from the paste supply and, therefore, also to the paste contained in the transport channel, when the controller is in the second switching position. In this way, relaxation of the paste, by viscous flow processes, in the direction of the delivery opening as mentioned in the introduction is counteracted so that formation of a drop at the delivery opening can be prevented.

For application to the section of the transport channel disconnected from the paste supply, the controller employed is formed such that it connects the disconnected part of the transport channel to a reduced pressure source in the second switching position. This may be done particularly advantageously by selecting a rotatably mounted and preferably cylindrically formed control axle as the controller, which comprises a passage via which the paste reservoir is in communicating connection with the delivery opening in the first switching position and the disconnected part of the transport channel is in communicating connection with the reduced pressure source in the second switching position.

So that the slot-shaped delivery opening can be supplied with electrode paste as uniformly as possible, at least the section of the transport channel between the controller and the delivery opening is preferably likewise formed in the shape of a slot. Flows of paste through such slot-shaped transport channels can be regulated particularly efficiently by a control axle. Preferably, the aforementioned passage in the control axle is a slot-shaped passage, the longitudinal section of which is adapted to the dimensions and geometry of the slot-shaped section of the transport channel so that flow of the paste through the channel with the least possible resistance is ensured in the first switching position. Such passages can be introduced into the control axle particularly well by wire electrical discharge machining.

The control axle is preferably mounted rotatably in a preferably cylindrical bore. The part of the transport channel coming from the paste reservoir and at least one reduced pressure channel coming from the reduced pressure source open therein. The bore furthermore comprises an outlet in the direction of the slot-shaped exit opening. At least the outlet and the entry opening of the transport channel preferably have the aforementioned slot shape. They are preferably both slot-shaped openings which axially penetrate through the wall of the bore. The entry of the reduced pressure channel is not necessarily slot-shaped.

The device is used in particular to carry out the described method, that is to say for intermittent coating of a moving surface with a paste which contains electrochemically active particles. It comprises a nozzle, which has the following components:
 a slot-shaped delivery opening,
 a transport channel via which the paste is supplied to the delivery opening from a paste reservoir,
 a controller that regulates the paste supply to the delivery opening and is formed such that it enables the paste supply to the delivery opening in a first switching position and, in a second switching position, blocks the transport channel and disconnects a section of the transport channel extending as far as the delivery opening from the paste supply,
 a reduced pressure channel via which the section of the transport channel disconnected from the paste supply can be connected to a reduced pressure source when the control means is in the second switching position.

The reduced pressure source may be a commercially available vacuum pump. Preferably, the reduced pressure source is coupled via the reduced pressure channel and the already-described passage in the controller to the part of the transport channel disconnected from the paste supply in the second switching position.

The method and device will be explained in more detail with the aid of the drawings. At this point, it should be emphasized explicitly that all the optional aspects, as described herein, of the method and the device may respectively be implemented on their own or in combination with one or more of the other described optional aspects. The following description of preferred examples merely serves for explanation and better understanding, and is in no way to be interpreted as restrictive.

Figure 1B:
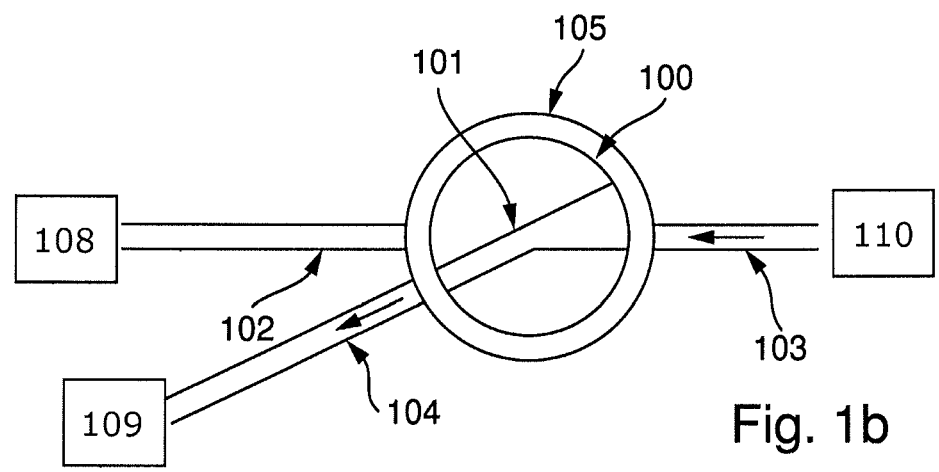

FIG. 1a represents a rotary valve having a rotatably mounted control axle 100 in cross section. It is in the first switching position in which the transport channel section 102 leading from a paste reservoir 108 connects via the slot-shaped passage 101 to the transport channel section 103 leading to a slot-shaped nozzle 110. The movement direction of the paste in the transport channel is represented by arrows. The control axle 100 is rotatably mounted in the bore 105. By rotation of the control axle through about 25° (counterclockwise), it is brought into the second switching position. This is represented in FIG. 1b. The transport channel is then blocked and the section 103 of the transport channel is disconnected from the paste supply. Instead, however, it is now in communicating connection via the slot-shaped passage 101 with the reduced pressure channel 104 leading to a reduced pressure source 109. A reduced pressure can be applied to the section 103 via the latter. Thus exerts a traction force on the paste contained in the section 103 in the direction of the arrows shown.

Figure 2:
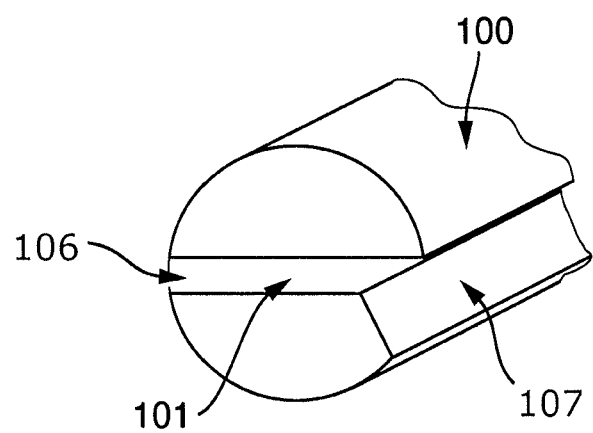
FIG. 2. is a preferred example of a controller.

An alternative sectional representation of the control axle 100 is shown in FIG. 2. The slot-shaped passage 101 has two differently formed exit openings. The opening angle of the opening 107 is much greater than the opening angle of the opening 106. This ensures that the passage 101 remains coupled to the transport channel section 103 when the control axle 100 is rotated into the second switching position. The size of the opening angle must in this case be matched to the radial distance between the transport channel section 102 and the reduced pressure channel 104. In general, the opening angle is 10° to 90°.

What is claimed is:

1. A device that intermittently coats a moving surface with a paste containing electrochemically active particles comprising:
 a nozzle having a slot-shaped delivery opening,
 a paste reservoir from which paste being supplied to the delivery opening via a transport channel and a slot-shaped passage within a rotary valve, the rotary valve having a rotatably mounted control axle that enables the paste supply to the delivery opening in a first switching position and, in a second switching position, disconnects the slot-shaped passage within the rotary valve from the paste supply, wherein intermittent coating of the moving surface with paste is provided via rotation of the control axle to cause flow or blockage of flow of paste from the paste reservoir as far as the delivery opening at predetermined time intervals,
 wherein the slot-shaped passage has different exit openings, one exit opening closer in proximity to the nozzle delivery opening, the one exit opening configured to maintain fluid communication with the delivery opening in both the first and second positions, the one exit opening having an opening angle greater than an opening angle of a second oppositely disposed exit opening in the slot-shaped passage, wherein the slot-shaped passage via which the paste reservoir is in communicating connection with the delivery opening in the first switching position is moved via rotation of the control axle wherein the delivery opening is in communicating connection with a reduced pressure channel in fluid communication with a cylindrical bore of the rotary valve in the second switching position, wherein the reduced pressure channel is connected to a reduced pressure source.

2. The device according to claim 1, wherein the transport channel is a slot.

3. The device according to claim 1, wherein the control axle is cylindrical and rotatably mounted in a cylindrical bore.

4. The device according to claim 3, wherein the bore comprises a slot-shaped outlet in a direction of the slot-shaped delivery opening.

* * * * *